United States Patent
Sakai

(10) Patent No.: US 11,460,453 B2
(45) Date of Patent: Oct. 4, 2022

(54) METHOD FOR DETERMINING FOOD-PRODUCT QUALITY AND FOOD-PRODUCT QUALITY DETERMINATION DEVICE

(71) Applicant: SHIMADZU CORPORATION, Kyoto (JP)

(72) Inventor: Takero Sakai, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 436 days.

(21) Appl. No.: 16/674,223

(22) Filed: Nov. 5, 2019

(65) Prior Publication Data

US 2020/0309746 A1 Oct. 1, 2020

(30) Foreign Application Priority Data

Mar. 29, 2019 (JP) .............................. JP2019-067448

(51) Int. Cl.
*G01N 30/72* (2006.01)
*G01N 30/88* (2006.01)
*G01N 30/86* (2006.01)

(52) U.S. Cl.
CPC ......... *G01N 30/72* (2013.01); *G01N 30/8637* (2013.01); *G01N 30/88* (2013.01)

(58) Field of Classification Search
CPC ....... G01N 2030/0045; G01N 2030/72; G01N 2030/86; G01N 2030/8634;
(Continued)

(56) References Cited

U.S. PATENT DOCUMENTS

| 2015/0212076 A1* | 7/2015 | Richter Dahlfors ... G01N 33/52 435/7.8 |
| 2016/0054276 A1* | 2/2016 | Song .................. G01N 30/8686 73/61.52 |
| 2019/0203287 A1* | 7/2019 | Amini .................... C12Q 1/689 |

FOREIGN PATENT DOCUMENTS

| JP | 2017-122677 A | 7/2017 |
| JP | 2018018354 A * | 2/2018 |

OTHER PUBLICATIONS

Estelles-Lopez, An automated ranking platform for machine learning regression models for meat spoilage prediction using multi-spectral imaging and metabolic profiling, Food Research International 99 (2017) 206-215. (Year: 2017).*

* cited by examiner

*Primary Examiner* — Michael J Dalbo
(74) *Attorney, Agent, or Firm* — Sughrue Mion, PLLC

(57) ABSTRACT

The method according to the present invention includes: a training sample measurement process (S1, S2) in which, for a food product belonging to the same kind as a determination target, a plurality of training samples individually labeled with a known state of quality are subjected to a measurement using a chromatograph mass spectrometer under the same analysis condition; a training sample data collection process (S3, S4) in which an index value related to the magnitude of a peak observed on an extracted ion chromatogram obtained by the measurement is acquired for each training sample, and the index value of the peak at each retention time common to the training samples is extracted; and a discrimination model creation process (S5-S7) in which a supervised training is performed to create a discrimination model, using, as the training data, the index value of the peak at each retention time common to the training samples acquired for each of the labeled training samples. Measurement data for (Continued)

an unknown sample is inputted into a discriminator based on the discrimination model, to obtain a quality discrimination result.

6 Claims, 2 Drawing Sheets

(58) Field of Classification Search
CPC ....... G01N 2030/8679; G01N 2030/88; G01N 2030/8637; G01N 30/72; G01N 30/86; G01N 30/8634; G01N 30/8679; G01N 30/88; G01N 30/8637
See application file for complete search history.

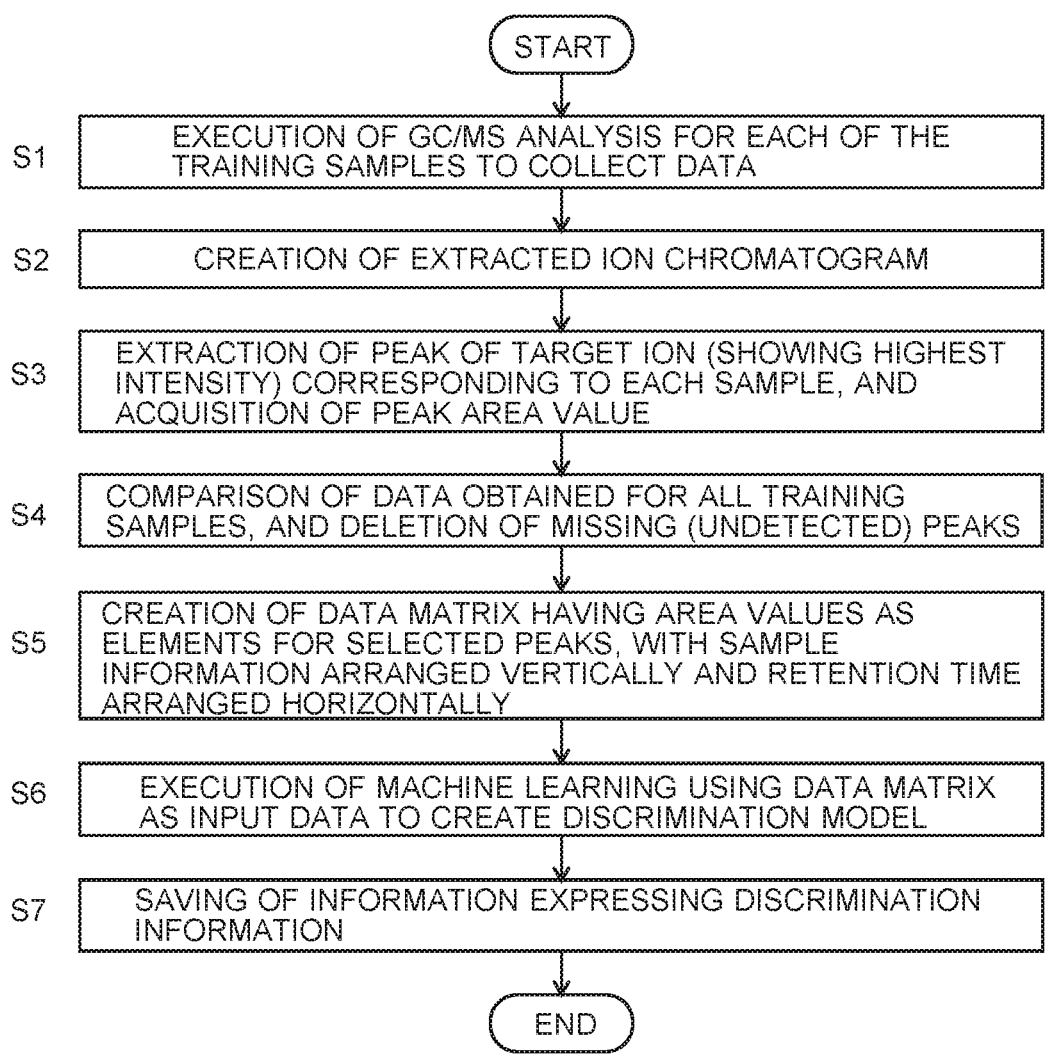

METHOD FOR DETERMINING FOOD-PRODUCT QUALITY AND FOOD-PRODUCT QUALITY DETERMINATION DEVICE

TECHNICAL FIELD

The present invention relates to a method for determining the quality of food products (inclusive of drinkables) and a device for such a method. The present invention is particularly useful for discriminating the degradation or freshness deterioration of food products.

BACKGROUND ART

The production, processing, distribution and other processes in the food industry require high levels of quality control. In recent years, the demand for such a quality control has been increasing.

Conventional and common methods for evaluating the quality degradation of food products in a manufacturing or processing scene have been based on a subjective evaluation of color, smell, taste and other aspects of the products. Meanwhile, attempts have been made to evaluate the quality using an analyzing device in order to perform more objective and efficient evaluation. For example, according to Patent Literature 1, the degree of freshness of fish can be evaluated by a quantitative analysis of non-volatile biogenic amines which are generated when fish is decayed, using a liquid chromatography or ion-selective electrode method.

Thus, conventional methods for evaluating the quality of food products using analyzing devices have normally been performed on the basis of the result of an analysis of the concentration of one or more specific kinds of index substances contained in the food product concerned. However, in some cases, such a method cannot satisfactorily detect a change in the quality of a food product composed by various kinds of components. There is also the following problem: If the origin of the food products is a plant or animal, it is often difficult to equalize the contents of the components among the food products even when those products are the same kind of product, so that incorrect determination or overlooking can easily occur if the degree of degradation of the food products is low.

CITATION LIST

Patent Literature

Patent Literature 1: JP 2017-122677 A

SUMMARY OF INVENTION

Technical Problem

The present invention has been developed to solve the previously described problems. Its objective is to provide a method and device for determining the quality of a food product which can objectively and correctly evaluate a change in the quality of a food product containing a considerable number of components.

Solution to Problem

A method for determining the quality of a food product according to one mode of the present invention developed for solving the previously described problems is a method for determining the quality of a food product which is a determination target, based on a result of a measurement on a sample originating from the food product using a chromatograph mass spectrometer, the method including:

a training sample measurement process in which, for a food product belonging to the same kind as the determination target, a plurality of training samples individually labeled with a known state of quality are subjected to a measurement using the chromatograph mass spectrometer under the same analysis condition;

a training sample data collection process in which an index value related to the magnitude of a peak observed on an extracted ion chromatogram obtained as a result of the measurement in the training sample measurement process is acquired for each of the plurality of training samples, and the index value of the peak at each retention time common to all of the training samples is extracted:

a discrimination model creation process in which a supervised training is performed to create a discrimination model, using, as the training data, the index value of the peak at each retention time common to all of the training samples acquired for each of the plurality of labeled training samples in the training sample data collection process;

an unknown sample measurement process in which a sample originating from the food product which is the determination target is subjected to a measurement using the chromatograph mass spectrometer under the aforementioned analysis condition;

an unknown sample data collection process in which the index value of the peak at each retention time common to all of the training samples, observed in an extracted ion chromatogram obtained as a result of the measurement in the unknown sample measurement process, is acquired; and a discrimination execution process in which data of the peak index values acquired in the unknown sample data collection process are inputted into a discriminator based on the discrimination model, to obtain a quality discrimination result.

A food-product quality determination device according to one mode of the present invention developed for solving the previously described problem is a device including a chromatograph mass spectrometer and configured to determine the quality of a food product using the quality determination method according to the previously described mode of the present invention, the device including:

a model storage section configured to store information constituting the discrimination model created through the training sample measurement process, the training sample data collection process and the discrimination model creation process;

an analysis controller configured to operate the chromatograph mass spectrometer so as to perform a measurement on a sample originating from a food product which is a determination target under a predetermined analysis condition;

an unknown sample data collector configured to acquire a peak index value at each retention time common to all of the training samples, observed in an extracted ion chromatogram obtained as a result of the measurement under the control of the analysis controller; and a discrimination executer configured to perform, for data of the peak index values acquired by the unknown sample data collector, a discriminating operation based on the discrimination model stored in the model storage section, to obtain a quality discrimination result for the unknown sample.

The term "learning" in the "supervised learning" in the present context means machine learning in a broad sense. In general, "machine learning" may be considered to be exclusive of multivariate analyses. However, the machine learning in the present context should be considered as including multivariate analyses. Accordingly, the machine learning in the present invention should be considered as including not only representative machine learning techniques, such as the support vector machine (SVM), neural network and random forest, but also various techniques which are commonly known as representative techniques of multivariate analysis for discrimination/regression, such as the logistic regression, partial least squares (PLS), orthogonal partial least square-discriminant analysis (OPLS-DA), and k-nearest neighbor.

Advantageous Effects of Invention

In the method and device for determining the quality of a food product according to one mode of the present invention, a discriminator (discrimination model) for evaluating the quality is constructed by machine learning in which the contents of the various kinds of components commonly contained in all samples that vary in quality are used as the predictor variables. Therefore, by using the method and device for determining the quality of a food product according to one mode of the present invention, it is possible to objectively and accurately evaluate a change in the quality of a food product containing a considerable number of components, or more specifically, degradation of the quality or deterioration of the freshness of the product.

BRIEF DESCRIPTION OF DRAWINGS

FIG. 3 is a flowchart showing a quality determination procedure using the food-product quality evaluation device according to the present embodiment.

FIG. 4 is a conceptual diagram of a data matrix created in the processing performed in the food-product quality evaluation device according to the present embodiment.

DESCRIPTION OF EMBODIMENTS

A food-product quality evaluation device according to one embodiment of the present invention, as well as a method for evaluating the quality of a food product using the same device, are hereinafter described with reference to the attached drawings.

Configuration of Device According to Present Embodiment

Figure 1:
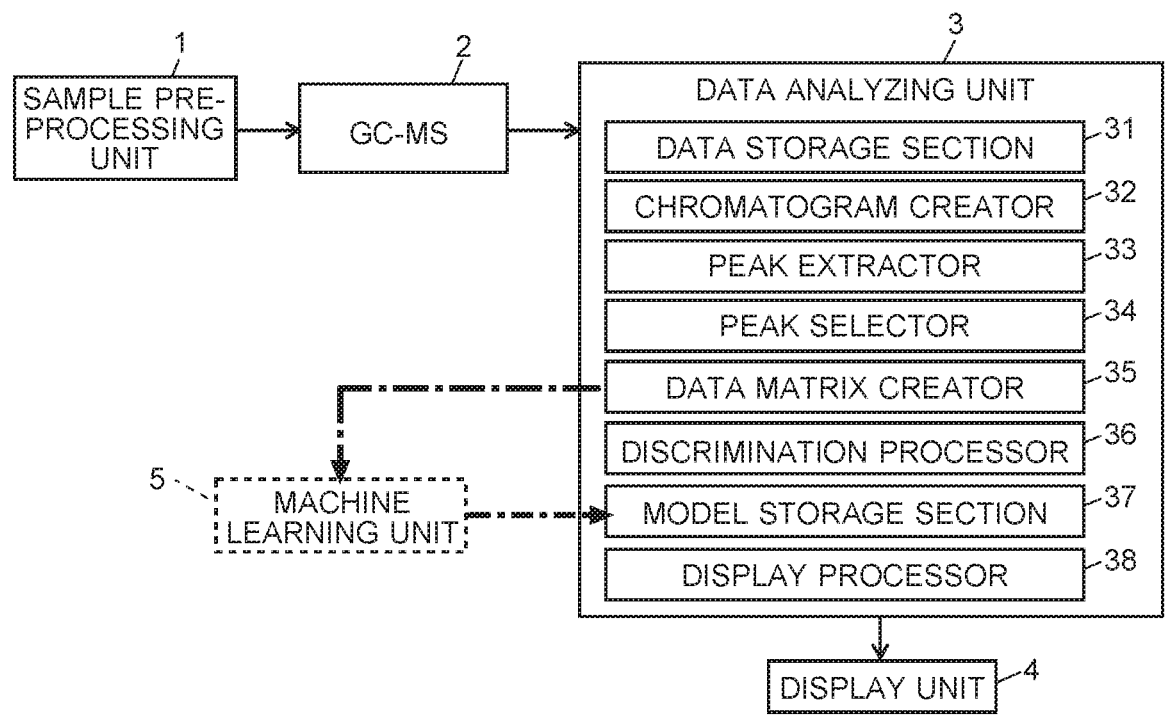
FIG. 1 is a block diagram showing a schematic configuration of a food-product quality evaluation device according to one embodiment of the present invention.

FIG. 1 is block diagram showing a schematic configuration of a food-product quality evaluation device according to the present embodiment.

As shown in FIG. 1, the present food-product quality evaluation device includes a sample preprocessing unit 1, gas chromatograph mass spectrometry unit (GC-MS) 2, data analyzing unit 3 and display unit 4. The mass spectrometer section in the gas chromatograph mass spectrometry unit 2 includes an ion source which employs an electron ionization (EI) method.

The data analyzing unit 3 includes, as its functional blocks, a data storage section 31, chromatogram creator 32, peak extractor 33, peak selector 34, data matrix creator 35, discrimination processor 36, model storage section 37 and display processor 38. The model storage section 37 is used for storing information constituting a trained discrimination model created by the training based on the training data in a machine learning unit 5, which is not a component of the present device.

Typically, the actual form of the data processing unit 3 is a personal computer or a more sophisticated type of computer called the "workstation", on which the functions of the aforementioned functional blocks can be realized by running, on this computer, a piece of data analysis software previously installed on the same computer.

The present device may also be configured as a system that includes the machine learning unit 5. However, it should be noted that the amount of computation for the machine learning for creating a discrimination model is normally much larger than the amount of computation for a discrimination process using an existing discrimination model. Therefore, an even more sophisticated computer must be used in order to include the machine learning unit 5 into the present device.

[Method for Creating Discriminator (Discrimination Model)]

As described previously, in order to evaluate the quality of an unknown sample with the present device, it is necessary to create a discrimination model by performing machine learning based on the training data in the machine leaning unit 5, and save the information expressing the model in the model storage section 37. The tasks and processes performed for creating the discrimination model are hereinafter described with reference to the flowchart shown in FIG. 3. Hereinafter considered is an example in which a food product that needs to be refrigerated is subjected to a determination concerning whether the product is stored in good conditions with no deterioration in quality (this state is hereinafter called the "good quality") or is stored in improper conditions causing a deterioration in quality (this state is hereinafter called the "low quality").

In the following description, for ease of explanation, it is assumed a series of tasks for creating the discrimination model is performed using the components shown in FIG. 1. In the case where the machine learning unit 5 is not a component of the food-product quality evaluation device according to the present embodiment, the device to be used for the series of tasks for creating the discrimination model is not the food-product quality evaluation device according to the present embodiment but another device having practically the same components as used in the food-product quality evaluation device according to the present embodiment.

As the training samples, a plurality of food-product samples each of which has already been known to be in "good quality" or "low quality" are prepared for each of the "good quality" and "low quality" groups. It is normally preferable to prepare the largest possible number of training samples. However, the number of samples that can be prepared is practically limited. It should also be noted that, after the number of training samples has been increased to a certain extent, a further increase in the number of training samples does not always yield a comparable improvement in discrimination accuracy. Accordingly, it is preferable to control the number of samples according to the required level of discrimination accuracy.

After the training samples have been individually subjected to a predetermined preprocessing in the sample preprocessing unit 1, an analysis is executed in the GC-MS unit 2 (Step S1). In the mass spectrometry section of the GC-MS unit 2, a scan measurement covering a predetermined range of mass-to-charge ratios is repeatedly performed, and a set of mass spectrum data is collected for each scan measurement. By such a GC-MS analysis, a set of data showing the signal intensity with respect to the two parameters of time and mass-to-charge ratio is acquired for each training sample and stored in the data storage section 31.

Next, for each training sample, the chromatogram creator 32 creates a chromatogram at each mass-to-charge ratio, i.e. an extracted ion chromatogram (which is also called the "mass chromatogram" according to convention), based on the aforementioned data (Step S2). The peak extractor 33 extracts, for each training sample, a chromatogram peak which is most likely to correspond to a component contained in the sample (such a peak is hereinafter simply called the "peak") and calculates the area value of that peak (Step S3).

The processing in Step S3 can specifically be performed as follows:

For one training sample, a peak is detected on each of the extracted ion chromatograms having different mass-to-charge ratios according to a predetermined peak detection algorithm. If there are two or more peaks whose peak tops are located at the same retention time on two or more extracted ion peak chromatograms having different mass-to-charge ratios, those peaks are considered as having originated from the same component. In such a case, a peak having the highest signal intensity should be selected, and those having lower signal intensities should be deleted. The selected peak can be considered as the peak of a target ion of one component. Such a processing is carried out for all detected peaks. Consequently, one peak is obtained for each component.

Figure 2:
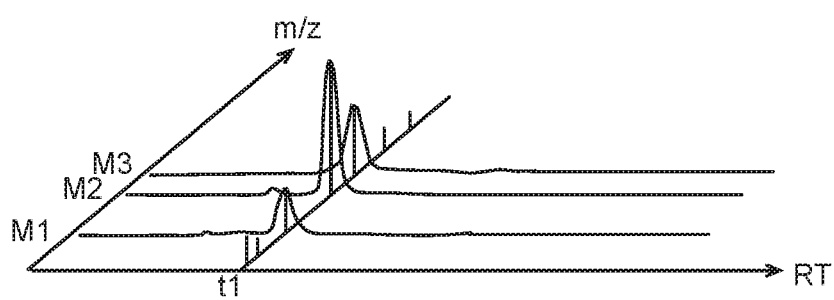
FIG. 2 is a diagram illustrating a peak extraction process in the food-product quality evaluation device according to the present embodiment.

FIG. 2 is a schematic diagram illustrating such a peak extraction process. In the present example, there are multiple peaks having their peak tops located at retention time t1, among which the peak at m/z=M2 has the highest signal intensity. Accordingly, the peak at RT=t1 and m/z=M2 is selected, while the peak at RT=t1 and mz=M1 as well as the peak at RT=t1 and m/z=M3 are deleted. Thus, only one of the peaks located at RT=t1 is extracted.

Such a processing is similarly performed for the extracted ion chromatograms corresponding to all training samples. Thus, for each training sample, one peak corresponding to one component is extracted for each component contained in the sample.

The peak selector 34 compares the information on the peaks corresponding to all training samples extracted in Step S3, and deletes each peak corresponding to a retention time which does not appear in all training samples, or in other words, a retention time which is missing (i.e. not detected) in any one of those training samples (Step S4). The remaining peaks which are thus selected without being deleted have area values which are not zero and are significant for all training samples. The process in Step S4 means that only the information on the concentrations of the components which are contained in all training samples is selected.

Next, the data matrix creator 35 creates a data matrix in which the peak area values of the peaks selected in Step S4 are arranged as the elements, with the sample information arranged in the vertical direction and the retention time in the horizontal direction (Step S5). FIG. 4 shows one example of the data matrix. The "Label" column contains binary data which represents either "good quality" or "low quality". For example, if the total number of training samples is 100, the data matrix has 100 rows. If the total number of peaks selected in Step S4 is 100, the data matrix has 100 columns (exclusive of the "Label" column).

Since each peak corresponding to a retention time which is missing in any one of the training samples has been deleted in Step S4 as described earlier, each element in this data matrix has a positive non-zero value. If the processing in Step S4 were not performed, a missing element would occur in the process of creating the data matrix, and an additional process for that element would be required, such as the setting of a value of zero or determining a supplementary interpolated value according to an appropriate algorithm. If that additional process were inappropriate, the discrimination accuracy would be lowered. By comparison, in the present embodiment, the processing in Step S4 eliminates the necessity of filling the missing element as well as decreases the amount of data to be used for the machine learning, so that the amount of computation for the machine learning can be reduced.

The machine learning unit 5 creates a discrimination model based on a predetermined machine learning technique using, as the training data, the data matrix prepared in the previously described manner (Step S6). The machine learning technique used in this step may be any regression or discrimination technique which is a type of supervised learning and can determine the label to which a piece of input data should belong to. Accordingly, examples of the available techniques include not only the representative machine learning techniques, such as the support vector machine, neural network and random forest, but also multivariate analysis techniques, such as the logistic regression, orthogonal partial least square-discriminant analysis and k-nearest neighbor.

After a trained discrimination model based on the training data has been created in this manner, a set of data expressing the discrimination model can be saved in the model storage section 37 in the food-product evaluation device according to the present embodiment (Step S7).

Thus, a set of data can be obtained which express a trained discrimination model to be saved in the model storage section 37 in the food-product evaluation device according to the present embodiment.

[Determination of Quality of Unknown Sample]

Next, a processing operation for determining the quality of an unknown sample using the food-product evaluation device according to the present embodiment is described.

After an unknown sample whose quality needs to be determined is subjected to a predetermined preprocessing in the sample preprocessing unit 1, an analysis is executed in the GC-MS unit 2. In the mass spectrometry section of the GC-MS unit 2, a scan measurement covering a predetermined range of mass-to-charge ratios is repeatedly performed, and a set of mass spectrum data is collected for each scan measurement. By such a GC-MS analysis, a set of data showing the signal intensity with respect to the two parameters of time and mass-to-charge ratio is stored in the data storage section 31.

Based on the data stored in the data storage section 31, the chromatogram creator 32 creates extracted ion chromatograms. The peak extractor 33 extracts each peak which is most likely to correspond to a component contained in the sample, and calculates its peak area value. These tasks can be carried out by the same processing as in Step S3 shown in FIG. 2. The peak selector 34 examines the extracted peaks and deletes each peak which is not included in the data matrix used in the process of creating the discrimination model, i.e. each peak which corresponds to the retention time deleted in Step S4 in FIG. 2.

The information concerning the remaining peaks. i.e. a one-dimensional data matrix or vector which includes the peak area values at the relevant retention times as the elements, are used as input data to be input into the discriminator based on the discrimination model stored in the model storage section 37. The discrimination processor 36 performs the discrimination processing based on the input data and outputs either the label of "good quality" or "low quality" as a discrimination result. The display processor 38 shows this discrimination result on the display unit 4 for users.

As described to this point, a determination result concerning whether or not an unknown sample is in good quality can be obtained by the food-product quality evaluation device according to the present embodiment. The discrimination model used for the quality determination is not a model based on one or a few specific kinds of specific components, but a model obtained through a learning process based on the concentration information of a significant number of kinds of components contained in the training samples. Therefore, a highly accurate discrimination can be achieved. In normal situations, peak information related to a foreign substance which is accidentally mixed in the unknown sample will not be used in the quality discrimination process. Therefore, a highly accurate discrimination can be achieved without being affected by such a foreign substance.

Experimental Example

One experimental example concerning the previously described food-product quality determination method is hereinafter described.

<Samples>

Beef was used as the samples whose quality should be determined. Two groups of samples were prepared. One group of samples were stored at an appropriate low temperature and kept in good conditions (this group is hereinafter called the "4° C. samples"), while the other group of samples were exposed to an environment of 40° C. for three hours and made to undergo quality degradation (this group is hereinafter called the "40° C. samples"). The two groups each included the same number of samples (58 samples) individually collected in measurement vials.

<Preprocessing and Analysis of Sample>

In order to analyze volatile components of beef, the samples were preprocessed by a solid phase microextraction (SPME) injection method. Specifically, a vial containing cut pieces of the sample was heated at 200° C. for 15 minutes, and the thereby generated gas was collected by the SPME and introduced into a GC-MS. A multifunctional autosampler system ACC-6000 capable of automatic collection and desorption of sample components by SPME, manufactured by Shimadzu Corporation, was used in the experiment. The conditions of the SPME were as shown in Table 1.

TABLE 1

| | |
|---|---|
| SPME Fiber | Divinylbenzene/Carboxen/ Polydimethylsiloxane (DVB/CAR/PDMS) |
| Adsorption Temperature | 200° C. |
| Adsorption Period | 15 min |
| Shaking Speed | 250 rpm |
| Desorption Period | 1 min |

The analysis conditions in the GC-MS were as shown in Table 2. As shown in Table 2, a scan measurement covering a mass-to-charge-ratio range of m/z 35-500 was repeated at intervals of 0.3 seconds in the mass spectrometry section of the GC-MS.

TABLE 2

| | |
|---|---|
| Column | SLB-5MS (30.0 m × 0.25 mm, 0.25 um) |
| Temperature of Injection Port | 280° C. |
| Injection Mode | split 5:1 |
| Temperature Program of Column Oven | 60° C. (1 min) - 20° C./min - 200° C. - 8° C./min - 320° C. (5 min) |
| Flow Control | linear speed: 50.0 cm/sec |
| Purge Flow Rate | 3 mL/sec |
| Temperature of Ion Source | 200° C. |
| Temperature of Interface | 250° C. |
| Measurement Mode | scan (m/z 35-500) |
| Event Time | 0.3 sec |

<Data Analysis>

The three-dimensional data having the three dimensions of time, mass-to-charge ratio and signal intensity, which had been collected for each of the 116 samples by the GC/MS analysis, were processed using analysis software for mass spectrometry MZmine 2 (ver. 2.32) to extract a peak from each extracted ion chromatogram. As noted earlier, each of those extracted peaks is a peak on an extracted ion chromatogram at the mass-to-charge ratio of a target ion which has the highest signal intensity on the mass spectrum for each component. Subsequently, the peak area was calculated for each peak. Such a processing was performed for all samples. As a result, a total of 9318 peaks were extracted. Among this entire group of peaks, each peak which did not have a corresponding peak (i.e. which was not detected) in any one of those samples was deleted. As a result, the number of peaks decreased to 200. A data matrix was created using the area values of the 200 peaks.

In the experiment, 116 samples were randomly divided into a training set including 92 samples and a test set including the remaining 24 samples, under the condition that the numbers of "4° C. samples" and "40° C. samples" should be equal to each other in both the training set and the test set. A discrimination model was created by machine learning in which the data corresponding to the 92 samples included in the learning set, i.e. a data matrix of 200 peaks×92 samples, were used as the input data. Using a discriminator based on this trained discrimination model, the 24 samples included in the test set were individually tested as to whether the sample was "4° C. sample" or "40° C. sample". Then, whether or not the obtained result was correct was evaluated.

Six kinds of algorithms were used as the discrimination technique: support vector machine, logistic regression, orthogonal partial least square-discriminant analysis (OPLS-DA), random forest, k-nearest neighbor and neural network. The specific implementation method of each algorithm and the evaluation result were as follows:

[1] Support Vector Machine (SVM)

SVM was implemented using scikit-learn (ver. 0.19.1), an open-source library for machine learning on Python 3.6. The RBF kernel (Gaussian kernel), which is the most commonly used kernel, was used as the kernel (functions). The cost parameter "C", which is a hyperparameter, and the RBF-kernel parameter "gamma" were each optimized by grid search.

Table 3 shows the evaluation result obtained with the discriminator using SVM. In the following tables, "4° C. samples" are described as "Positive", while "40° C. samples" are described as "Negative". The discriminator using the SVM achieved a discrimination precision of 95.8%, the highest result in the present experiment.

TABLE 3

|  | True | False |
|---|---|---|
| Positive | 12 | 0 |
| Negative | 11 | 1 |
| Precision | 95.8% | |

[2] Logistic Regression

As with the support vector machine, logistic regression was implemented using scikit-learn (ver. 0.19.1) on Python 3.6. Only the cost parameter "C" was optimized by grid search.

Table 4 shows the evaluation result obtained with the discriminator using logistic regression. The discrimination precision of this discriminator was 79.1%.

TABLE 4

|  | True | False |
|---|---|---|
| Positive | 8 | 4 |
| Negative | 11 | 1 |
| Precision | 79.1% | |

[3] Orthogonal Partial Least Square-Discriminant Analysis (OPLS-DA)

OPLS-DA was implemented using SIMCA 14, which is multivariate analysis software manufactured by Umetrics, Sweden. The data were normalized by auto-scaling. The number of components was selected so that the Q2 value would be maximized. Only the cost parameter "C" was optimized by grid search.

Table 5 shows the evaluation result obtained with the discriminator using OPLS-DA. The discrimination precision of this discriminator was 79.1%.

TABLE 5

|  | True | False |
|---|---|---|
| Positive | 11 | 1 |
| Negative | 9 | 3 |
| Precision | 83.3% | |

[4] Random Forest

Random forest was implemented using "RandomForestClassifier" of scikit-learn (ver. 0.19.1) on Python 3.6. Hyperparameters "n_estimators". "max_features", "max_depth" and "min_samples_leaf" were optimized by grid search.

Table 6 shows the evaluation result obtained with the discriminator using random forest. The discrimination precision of this discriminator was 70.8%.

TABLE 6

|  | True | False |
|---|---|---|
| Positive | 7 | 5 |
| Negative | 10 | 2 |
| Precision | 70.8% | |

[5] k-Nearest Neighbor

The k-nearest neighbor method was implemented using "KNeighborsClassifier" of scikit-learn (ver. 0.19.1) on Python 3.6. Hyperparameters "n_neighbors", "p", "wight" and "leaf_size" were optimized by grid search.

Table 7 shows the evaluation result obtained with the discriminator using the k-nearest neighbor method. The discrimination precision of this discriminator was 70.8%.

TABLE 7

|  | True | False |
|---|---|---|
| Positive | 6 | 6 |
| Negative | 11 | 1 |
| Precision | 70.8% | |

[6] Neural Network

Neural network was implemented using Tensorflow (ver. 1.7) on Python 3.6. The default function "DNNRegressor" was used for the discrimination. The values of the hyperparameters "learning_rate", "steps", "hidden_units" and "batch_size" were appropriately selected, although they were not always optimized.

Table 8 shows the evaluation result obtained with the discriminator using neural network. The discrimination precision of this discriminator was 79.1%. Although the size of data used in the present experiment seemed to be too small to apply the neural network, the discrimination precision was comparatively high. It is expected that the discrimination precision can be further improved, for example, by increasing the number of samples used as the training samples or more finely adjusting the hyperparameters.

TABLE 8

|  | True | False |
|---|---|---|
| Positive | 8 | 4 |
| Negative | 11 | 1 |
| Precision | 79.1% | |

As described so far, it has been confirmed that the quality of food products can be discriminated with a considerable degree of satisfaction by the previously described quality determination method, although the discrimination precision varies depending what algorithm is used for the discrimination. In particular, the discriminator using the SVM has proved itself to be effective in automatic determination of the degradation of the food product or other applications by exhibiting a particularly high level of accuracy even in the situation in which the number of samples is comparatively small as in the previously described experiment.

It should be noted that the previous embodiment is a mere example of the present invention, and any modification, change or addition appropriately made within the spirit of the present invention will evidently fall within the scope of claims of the present application.

[Various Modes]

It is evident for a person skilled in the art that the previously described illustrative embodiments are specific examples of the following modes of the present invention.

A method for determining the quality of a food product according to the first mode of the present invention is a method for determining the quality of a food product which is a determination target, based on a result of a measurement on a sample originating from the food product using a chromatograph mass spectrometer, the method including:

a training sample measurement process in which, for a food product belonging to the same kind as the determination target, a plurality of training samples individually labeled with a known state of quality are subjected to a measurement using the chromatograph mass spectrometer under the same analysis condition;

a training sample data collection process in which an index value related to the magnitude of a peak observed on an extracted ion chromatogram obtained as a result of the measurement in the training sample measurement process is acquired for each of the plurality of training samples, and the index value of the peak at each retention time common to all of the training samples is extracted;

a discrimination model creation process in which a supervised training is performed to create a discrimination model, using, as the training data, the index value of the peak at each retention time common to all of the training samples acquired for each of the plurality of labeled training samples in the training sample data collection process;

an unknown sample measurement process in which a sample originating from the food product which is the determination target is subjected to a measurement using the chromatograph mass spectrometer under the aforementioned analysis condition;

an unknown sample data collection process in which the index value of the peak at each retention time common to all of the training samples, observed in an extracted ion chromatogram obtained as a result of the measurement in the unknown sample measurement process, is acquired; and a discrimination execution process in which data of the peak index values acquired in the unknown sample data collection process are inputted into a discriminator based on the discrimination model, to obtain a quality discrimination result.

A food-product quality determination device according to the first mode of the present invention is a device including a chromatograph mass spectrometer and configured to determine the quality of a food product using the quality determination method according to the previously described mode of the present invention, the device including:

a model storage section configured to store information constituting the discrimination model created through the training sample measurement process, the training sample data collection process and the discrimination model creation process;

an analysis controller configured to operate the chromatograph mass spectrometer so as to perform a measurement on a sample originating from a food product which is a determination target under a predetermined analysis condition;

an unknown sample data collector configured to acquire a peak index value at each retention time common to all of the training samples, observed in an extracted ion chromatogram obtained as a result of the measurement under the control of the analysis controller; and a discrimination executer configured to perform, for data of the peak index values acquired by the unknown sample data collector, a discriminating operation based on the discrimination model stored in the model storage section, to obtain a quality discrimination result for the unknown sample.

The "an index value related to the magnitude of a peak" may be a height value of a peak on a chromatogram or an area value of the peak. The "peak at each retention time common to all of the training samples" is a peak which appears on the chromatograms of all training samples at the same retention time. Only one of the peaks which appear at the same retention time in the extracted ion chromatograms with different mass-to-charge ratios needs to be used for each training sample. This single peak should preferably be a peak on the extracted ion chromatogram of the target ion having the highest signal intensity.

The "peak at each retention time common to all of the training samples" can be considered to be a peak originating from a component commonly contained in all training samples. Accordingly, in the method for determining the quality of a food product and the food-product quality determination device according to the first mode of the present invention, a discriminator (discrimination model) for evaluating the quality is constructed by machine learning in which the contents of various kinds of components commonly contained in all of the plurality of samples that vary in quality are used as the predictor variables after removing the influence of components which are contained in only a portion of the plurality of samples that vary in quality. Therefore, by using the method and device for determining the quality of a food product according to the first mode of the present invention, it is possible to objectively and accurately evaluate a change in the quality of a food product containing a considerable number of components, or more specifically, degradation of the quality or deterioration of the freshness of the product.

In the second mode of the present invention, which is a variation of the method for determining the quality of a food product and the food-product quality determination device according to the first mode, the algorithm of the machine learning is a support vector machine.

The present invention allows for the use of any one of the various algorithms for discrimination, including the support vector machine, neural network, random forest, logistic regression, partial least squares, orthogonal partial least square-discriminant analysis and k-nearest neighbor. The support vector machine is particularly useful for realizing a high level of discrimination performance even when the number of training samples is small.

In the third mode of the present invention, which is a variation of the method for determining the quality of a food product and the food-product quality determination device according to the first or second mode, the chromatograph mass spectrometer is a gas chromatograph mass spectrometer using an electron ionization source.

Electron ionization sources easily induce fragmentation in the ionization of sample components. Therefore, in normal situations, a plurality of different components whose masses are the same or extremely close to each other can be individually detected in the form of fragment ions having different mass-to-charge ratios. This lowers the probability of the unfavorable situation in which different components contained in separate samples are incorrectly handled as the same component, so that the accuracy of the discrimination model can be improved.

REFERENCE SIGNS LIST

1 . . . Sample Preprocessing Unit
2 . . . Gas Chromatograph Mass Spectrometry Unit
3 . . . Data Analyzing Unit
31 . . . Data Storage Section
32 . . . Chromatogram Creator
33 . . . Peak Extractor
34 . . . Peak Selector
35 . . . Data Matrix Creator
36 . . . Discrimination Processor
37 . . . Model Storage Section
38 . . . Display Processor
4 . . . Display Unit
5 . . . Machine Learning Unit

The invention claimed is:

1. A method for determining a quality of a food product which is a determination target, based on a result of a measurement on a sample originating from the food product using a chromatograph mass spectrometer, the method comprising:

a training sample measurement process in which, for a food product belonging to the same kind as the determination target, a plurality of training samples individually labeled with a known state of quality are subjected to a measurement using the chromatograph mass spectrometer under a same analysis condition;

a training sample data collection process in which an index value related to a magnitude of a peak observed on an extracted ion chromatogram obtained as a result of the measurement in the training sample measurement process is acquired for each of the plurality of training samples, and the index value of the peak at each retention time common to all of the training samples is extracted;

a discrimination model creation process in which a supervised training is performed to create a discrimination model, using, as training data, the index value of the peak at each retention time common to all of the training samples acquired for each of the plurality of labeled training samples in the training sample data collection process;

an unknown sample measurement process in which a sample originating from the food product which is the determination target is subjected to a measurement using the chromatograph mass spectrometer under the aforementioned analysis condition;

an unknown sample data collection process in which the index value of the peak at each retention time common to all of the training samples, observed in an extracted ion chromatogram obtained as a result of the measurement in the unknown sample measurement process, is acquired; and a discrimination execution process in which data of the peak index values acquired in the unknown sample data collection process are inputted into a discriminator based on the discrimination model, to obtain a quality discrimination result.

2. The method for determining a quality of a food product according to claim 1, wherein an algorithm of the machine learning is a support vector machine.

3. The method for determining a quality of a food product according to claim 1, wherein the chromatograph mass spectrometer is a gas chromatograph mass spectrometer using an electron ionization source.

4. A device including a chromatograph mass spectrometer and configured to determine a quality of a food product using the quality determination method according to claim 1, the device comprising:

a controller configured to operate the chromatograph mass spectrometer so as to perform a measurement on a sample originating from a food product which is a determination target under a predetermined analysis condition; and a computer including a model storage, the computer configured to store information constituting the discrimination model created through the training sample measurement process, the training sample data collection process and the discrimination model creation process in the model storage;

acquire a peak index value at each retention time common to all of the training samples, observed in an extracted ion chromatogram obtained as a result of the measurement under a control of the controller; and perform, for data of the acquired peak index values, a discriminating operation based on the discrimination model stored in the model storage, to obtain a quality discrimination result for the unknown sample.

5. A device including a chromatograph mass spectrometer and configured to determine a quality of a food product using the quality determination method according to claim 2, the device comprising:

a controller configured to operate the chromatograph mass spectrometer so as to perform a measurement on a sample originating from a food product which is a determination target under a predetermined analysis condition; and a computer including a model storage, the computer configured to store information constituting the discrimination model created through the training sample measurement process, the training sample data collection process and the discrimination model creation process in the model storage;

acquire a peak index value at each retention time common to all of the training samples, observed in an extracted ion chromatogram obtained as a result of the measurement under a control of the analysis controller; and perform, for data of the acquired peak index values, a discriminating operation based on the discrimination model stored in the model storage, to obtain a quality discrimination result for the unknown sample.

6. A device including a chromatograph mass spectrometer and configured to determine a quality of a food product using the quality determination method according to claim 3, the device comprising:

a controller configured to operate the chromatograph mass spectrometer so as to perform a measurement on a sample originating from a food product which is a determination target under a predetermined analysis condition;

a computer including a model storage, the computer configured to store information constituting the discrimination model created through the training sample measurement process, the training sample data collection process and the discrimination model creation process in the model storage;

acquire a peak index value at each retention time common to all of the training samples, observed in an extracted ion chromatogram obtained as a result of the measurement under a control of the analysis controller; and perform, for data of the acquired peak index values, a discriminating operation based on the discrimination model stored in the model storage, to obtain a quality discrimination result for the unknown sample.

* * * * *